United States Patent
Singh et al.

(10) Patent No.: US 12,004,019 B2
(45) Date of Patent: Jun. 4, 2024

(54) TECHNIQUES FOR IMPROVEMENT OF VOICE OVER Wi-Fi TO VOICE OVER CELLULAR HANDOVERS

(71) Applicant: QUALCOMM Incorporated, San Diego, CA (US)

(72) Inventors: Vikram Singh, San Diego, CA (US); Yong Xie, San Diego, CA (US); Carlos Marcelo Dias Pazos, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 351 days.

(21) Appl. No.: 17/450,018

(22) Filed: Oct. 5, 2021

(65) Prior Publication Data

US 2022/0116829 A1    Apr. 14, 2022

Related U.S. Application Data

(60) Provisional application No. 63/198,307, filed on Oct. 9, 2020.

(51) Int. Cl.
*H04W 36/00* (2009.01)
*H04W 36/30* (2009.01)

(52) U.S. Cl.
CPC ....... *H04W 36/0022* (2013.01); *H04W 36/30* (2013.01)

(58) Field of Classification Search
CPC . H04W 36/0022; H04W 36/14; H04W 88/06; H04W 36/30; H04W 36/0055; H04W 36/0066; H04W 36/34
See application file for complete search history.

(56) References Cited

U.S. PATENT DOCUMENTS

2015/0334575 A1*  11/2015  Joshi ................. H04L 1/00
                                                        370/329
2020/0267605 A1*  8/2020  Bae .................. H04W 36/0022
(Continued)

FOREIGN PATENT DOCUMENTS

EP          3800935 A1    4/2021
WO    WO-2016126409 A1   8/2016
(Continued)

OTHER PUBLICATIONS

ETSI TS 123 502: "5G; Procedures for the 5G System (3GPP TS 23.502 Version 15.2.0 Release 15)", V15.2.0, Jun. 2018, 311 Pages.
(Continued)

*Primary Examiner* — Allahyar Kasraian
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may determine, during an active call on a first radio access technology (RAT), that a first condition for performing a handover from the first RAT to a second RAT is satisfied. The UE may determine that the second RAT would trigger a fallback to a third RAT after the handover from the first RAT to the second RAT and that a second condition for performing a handover from the third RAT to the first RAT is satisfied. The UE may refrain from performing the handover from the first RAT to the second RAT based at least in part on the determination that the second RAT would trigger the fallback and the determination that the second condition is satisfied. Numerous other aspects are provided.

30 Claims, 9 Drawing Sheets

(56) References Cited

U.S. PATENT DOCUMENTS

| | | | |
|---|---|---|---|
| 2020/0275259 A1* | 8/2020 | Zhu | H04W 76/16 |
| 2021/0105691 A1* | 4/2021 | Zhu | H04L 65/1073 |
| 2021/0127314 A1* | 4/2021 | Mukherjee | H04W 60/005 |
| 2021/0136645 A1* | 5/2021 | Zhao | H04W 36/30 |
| 2021/0153290 A1 | 5/2021 | Ahmad et al. | |
| 2023/0036966 A1* | 2/2023 | Agarwal | H04W 36/18 |

FOREIGN PATENT DOCUMENTS

| | | |
|---|---|---|
| WO | 2021111414 A1 | 6/2021 |
| WO | WO-2021157767 A1 * | 8/2021 |
| WO | WO-2021215781 A1 | 10/2021 |

OTHER PUBLICATIONS

International Search Report and Written Opinion—PCT/US2021/071742—ISA/EPO—dated Mar. 30, 2022.

Ericsson: "Use of EPS/RAT Fallback for VoWiFi Session", 3GPP Draft, 3GPP TSG-SA2 Meeting #136AH, S2-2000338, 3rd Generation Partnership Project (3GPP), Mobile Competence Centre, 650, Route Des Lucioles, F-06921 Sophia-Antipolis Cedex, France, vol. SA WG2, No. Incheon, KR, Jan. 13, 2020-Jan. 17, 2020, Jan. 7, 2020 (Jan. 7, 2020), XP051842411, 3 Pages, Retrieved from the Internet: URL: https://ftp.3gpp.org/tsg_sa/WG2_Arch/TSGS2_136AH_Incheon/Docs/S2-2000338.zip S2-2000338_23502CRxxxxVoWiFi HO.docx [Retrieved on Jan. 7, 2020], The Whole Document.

Partial International Search Report—PCT/US2021/071742—ISA/EPO—dated Feb. 9, 2022.

\* cited by examiner

TECHNIQUES FOR IMPROVEMENT OF VOICE OVER Wi-Fi TO VOICE OVER CELLULAR HANDOVERS

CROSS-REFERENCE TO RELATED APPLICATION

This Patent Application claims priority to U.S. Provisional Patent Application No. 63/198,307, filed on Oct. 9, 2020, entitled "TECHNIQUES FOR IMPROVEMENT OF VOICE OVER WI-FI TO VOICE OVER CELLULAR HANDOVERS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for improvement of voice over Wi-Fi to voice over cellular handovers.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes determining, during an active call on a first radio access technology (RAT), that a first condition for performing a handover from the first RAT to a second RAT is satisfied; determining that the second RAT would trigger a fallback to a third RAT after the handover from the first RAT to the second RAT; determining that a second condition for performing a handover from the third RAT to the first RAT is satisfied; and refraining from performing the handover from the first RAT to the second RAT based at least in part on the determination that the second RAT would trigger the fallback and the determination that the second condition for performing the handover from the third RAT to the first RAT is satisfied.

In some aspects, the determination that the first condition for performing the handover from the first RAT to the second RAT is satisfied is based at least in part on at least one of: a preference indicating that the second RAT is preferred over the first RAT for voice calls, a signal strength associated with the first RAT, or a signal strength associated with the second RAT.

In some aspects, determining that the second RAT would trigger the fallback comprises determining that a cell identifier associated with the second RAT is included in a set of stored cell identifiers that identifies cells of the second RAT that trigger fallbacks.

In some aspects, the method includes determining that the second RAT has triggered a fallback at a time prior to the active call, and storing a cell identifier associated with the second RAT in a set of stored cell identifiers that identifies cells of the second RAT that have triggered fallbacks.

In some aspects, the determination that the second condition for performing the handover from the third RAT to the first RAT is satisfied is based at least in part on a signal strength associated with the third RAT.

In some aspects, the method includes measuring a signal strength associated with the third RAT based at least in part on the determination that the second RAT would trigger the fallback.

In some aspects, the signal strength associated with the third RAT is measured during an idle time in the second RAT.

In some aspects, the signal strength associated with the third RAT is measured using a radio frequency (RF) resource of an unused subscriber identification module (SIM) of the UE.

In some aspects, the first RAT is Wi-Fi, the second RAT is NR, the third RAT is LTE, and the fallback is an Evolved Packet System (EPS) fallback.

In some aspects, a method of wireless communication performed by a UE includes determining, during an active call on a first RAT, that a signal strength associated with the first RAT is within a particular range above a handover threshold associated with triggering a handover from the first RAT to a second RAT; determining, based at least in part on a signal strength of the second RAT, that the active call would be moved from the second RAT to a third RAT after the handover from the first RAT to the second RAT; and triggering mobility from the second RAT to the third RAT based at least in part on the determination that the signal strength associated with the first RAT is within the particular range and the determination that the active call would be moved from the second RAT to the third RAT.

In some aspects, triggering the mobility comprises configuring a priority of the third RAT to be greater than a priority of the second RAT to cause the UE to reselect to the third RAT from the second RAT when the UE is operating in a radio resource control (RRC) idle mode.

In some aspects, triggering the mobility comprises creating a radio link failure on the second RAT to cause the UE to re-establish a link on the third RAT when the UE is operating in a RRC connected mode.

In some aspects, the method includes determining that a condition for performing a handover from the first RAT to the third RAT is satisfied, and performing the handover from the first RAT to the third RAT based at least in part on determining that the condition is satisfied.

In some aspects, the determination that the active call would be moved from the second RAT to the third RAT comprises: identifying a stored signal strength at which mobility, associated with the second RAT, was previously triggered, and determining that the active call would be moved from the second RAT to the third RAT based at least in part on a determination that the signal strength associated with the second RAT is less than or equal to the stored signal strength.

In some aspects, the identification of the stored signal strength is based at least in part on a cell identifier associated with the second RAT.

In some aspects, the first RAT is Wi-Fi, the second RAT is NR, and the third RAT is LTE.

In some aspects, a UE for wireless communication includes a memory and one or more processors coupled to the memory, the memory and the one or more processors configured to: determine, during an active call on a first RAT, that a first condition for performing a handover from the first RAT to a second RAT is satisfied; determine that the second RAT would trigger a fallback to a third RAT after the handover from the first RAT to the second RAT; determine that a second condition for performing a handover from the third RAT to the first RAT is satisfied; and refrain from performing the handover from the first RAT to the second RAT based at least in part on the determination that the second RAT would trigger the fallback and the determination that the second condition for performing the handover from the third RAT to the first RAT is satisfied.

In some aspects, the determination that the first condition for performing the handover from the first RAT to the second RAT is satisfied is based at least in part on at least one of: a preference indicating that the second RAT is preferred over the first RAT for voice calls, a signal strength associated with the first RAT, or a signal strength associated with the second RAT.

In some aspects, the one or more processors, when determining that the second RAT would trigger the fallback, are configured to determine that a cell identifier associated with the second RAT is included in a set of stored cell identifiers that identifies cells of the second RAT that trigger fallbacks.

In some aspects, the one or more processors are further configured to: determine that the second RAT has triggered a fallback at a time prior to the active call, and store a cell identifier associated with the second RAT in a set of stored cell identifiers that identifies cells of the second RAT that have triggered fallbacks.

In some aspects, the determination that the second condition for performing the handover from the third RAT to the first RAT is satisfied is based at least in part on a signal strength associated with the third RAT.

In some aspects, the one or more processors are further configured to measure a signal strength associated with the third RAT based at least in part on the determination that the second RAT would trigger the fallback.

In some aspects, the signal strength associated with the third RAT is measured during an idle time in the second RAT.

In some aspects, the signal strength associated with the third RAT is measured using an RF resource of an unused SIM of the UE.

In some aspects, the first RAT is Wi-Fi, the second RAT is NR, the third RAT is LTE, and the fallback is an EPS fallback.

In some aspects, a UE for wireless communication includes a memory and one or more processors coupled to the memory, the memory and the one or more processors configured to: determine, during an active call on a first RAT, that a signal strength associated with the first RAT is within a particular range above a handover threshold associated with triggering a handover from the first RAT to a second RAT; determine, based at least in part on a signal strength of the second RAT, that the active call would be moved from the second RAT to a third RAT after the handover from the first RAT to the second RAT; and trigger mobility from the second RAT to the third RAT based at least in part on the determination that the signal strength associated with the first RAT is within the particular range and the determination that the active call would be moved from the second RAT to the third RAT.

In some aspects, the one or more processors, when triggering the mobility, are configured to configure a priority of the third RAT to be greater than a priority of the second RAT, to cause the UE to reselect to the third RAT from the second RAT when the UE is operating in an RRC idle mode.

In some aspects, the one or more processors, when triggering the mobility, are configured to create a radio link failure on the second RAT, to cause the UE to re-establish a link on the third RAT when the UE is operating in an RRC connected mode.

In some aspects, the one or more processors are further configured to: determine that a condition for performing a handover from the first RAT to the third RAT is satisfied, and perform the handover from the first RAT to the third RAT based at least in part on determining that the condition is satisfied.

In some aspects, the determination that the active call would be moved from the second RAT to the third RAT comprises: identifying a stored signal strength at which mobility, associated with the second RAT, was previously triggered, and determining that the active call would be moved from the second RAT to the third RAT based at least in part on a determination that the signal strength associated with the second RAT is less than or equal to the stored signal strength.

In some aspects, the identification of the stored signal strength is based at least in part on a cell identifier associated with the second RAT.

In some aspects, the first RAT is Wi-Fi, the second RAT is NR, and the third RAT is LTE.

In some aspects, a non-transitory computer-readable medium storing a set of instructions for wireless communication includes one or more instructions that, when executed by one or more processors of a UE, cause the UE to: determine, during an active call on a first RAT, that a first condition for performing a handover from the first RAT to a second RAT is satisfied; determine that the second RAT would trigger a fallback to a third RAT after the handover from the first RAT to the second RAT; determine that a second condition for performing a handover from the third RAT to the first RAT is satisfied; and refrain from performing the handover from the first RAT to the second RAT based at least in part on the determination that the second RAT would trigger the fallback and the determination that the second condition for performing the handover from the third RAT to the first RAT is satisfied.

In some aspects, the determination that the first condition for performing the handover from the first RAT to the second RAT is satisfied is based at least in part on at least one of: a preference indicating that the second RAT is preferred over the first RAT for voice calls, a signal strength associated with the first RAT, or a signal strength associated with the second RAT.

In some aspects, the one or more instructions, that cause the UE to determine that the second RAT would trigger the fallback, cause the UE to determine that a cell identifier associated with the second RAT is included in a set of stored cell identifiers that identifies cells of the second RAT that trigger fallbacks.

In some aspects, the one or more instructions further cause the UE to: determine that the second RAT has triggered a fallback at a time prior to the active call, and store a cell identifier associated with the second RAT in a set of stored cell identifiers that identifies cells of the second RAT that have triggered fallbacks.

In some aspects, the determination that the second condition for performing the handover from the third RAT to the first RAT is satisfied is based at least in part on a signal strength associated with the third RAT.

In some aspects, the one or more instructions further cause the UE to measure a signal strength associated with the third RAT based at least in part on the determination that the second RAT would trigger the fallback.

In some aspects, the signal strength associated with the third RAT is measured during an idle time in the second RAT.

In some aspects, the signal strength associated with the third RAT is measured using an RF resource of an unused SIM of the UE.

In some aspects, the first RAT is Wi-Fi, the second RAT is NR, the third RAT is LTE, and the fallback is an EPS fallback.

In some aspects, a non-transitory computer-readable medium storing a set of instructions for wireless communication includes one or more instructions that, when executed by one or more processors of a UE, cause the UE to: determine, during an active call on a first RAT, that a signal strength associated with the first RAT is within a particular range above a handover threshold associated with triggering a handover from the first RAT to a second RAT; determine, based at least in part on a signal strength of the second RAT, that the active call would be moved from the second RAT to a third RAT after the handover from the first RAT to the second RAT; and trigger mobility from the second RAT to the third RAT based at least in part on the determination that the signal strength associated with the first RAT is within the particular range and the determination that the active call would be moved from the second RAT to the third RAT.

In some aspects, the one or more instructions, that cause the UE to trigger the mobility, cause the UE to configure a priority of the third RAT to be greater than a priority of the second RAT, to cause the UE to reselect to the third RAT from the second RAT when the UE is operating in an RRC idle mode.

In some aspects, the one or more instructions, that cause the UE to trigger the mobility, cause the UE to create a radio link failure on the second RAT, to cause the UE to re-establish a link on the third RAT when the UE is operating in an RRC connected mode.

In some aspects, the one or more instructions further cause the UE to: determine that a condition for performing a handover from the first RAT to the third RAT is satisfied, and perform the handover from the first RAT to the third RAT based at least in part on determining that the condition is satisfied.

In some aspects, the determination that the active call would be moved from the second RAT to the third RAT comprises: identifying a stored signal strength at which mobility, associated with the second RAT, was previously triggered, and determining that the active call would be moved from the second RAT to the third RAT based at least in part on a determination that the signal strength associated with the second RAT is less than or equal to the stored signal strength.

In some aspects, the identification of the stored signal strength is based at least in part on a cell identifier associated with the second RAT.

In some aspects, the first RAT is Wi-Fi, the second RAT is NR, and the third RAT is LTE.

In some aspects, an apparatus for wireless communication includes means for determining, during an active call on a first RAT, that a first condition for performing a handover from the first RAT to a second RAT is satisfied; means for determining that the second RAT would trigger a fallback to a third RAT after the handover from the first RAT to the second RAT; means for determining that a second condition for performing a handover from the third RAT to the first RAT is satisfied; and means for refraining from performing the handover from the first RAT to the second RAT based at least in part on the determination that the second RAT would trigger the fallback and the determination that the second condition for performing the handover from the third RAT to the first RAT is satisfied.

In some aspects, the determination that the first condition for performing the handover from the first RAT to the second RAT is satisfied is based at least in part on at least one of: a preference indicating that the second RAT is preferred over the first RAT for voice calls, a signal strength associated with the first RAT, or a signal strength associated with the second RAT.

In some aspects, the means for determining that the second RAT would trigger the fallback comprises means for determining that a cell identifier associated with the second RAT is included in a set of stored cell identifiers that identifies cells of the second RAT that trigger fallbacks.

In some aspects, the apparatus includes means for determining that the second RAT has triggered a fallback at a time prior to the active call, and means for storing a cell identifier associated with the second RAT in a set of stored cell identifiers that identifies cells of the second RAT that have triggered fallbacks.

In some aspects, the determination that the second condition for performing the handover from the third RAT to the first RAT is satisfied is based at least in part on a signal strength associated with the third RAT.

In some aspects, the apparatus includes means for measuring a signal strength associated with the third RAT based at least in part on the determination that the second RAT would trigger the fallback.

In some aspects, the signal strength associated with the third RAT is measured during an idle time in the second RAT.

In some aspects, the signal strength associated with the third RAT is measured using an RF resource of an unused SIM of the apparatus.

In some aspects, the first RAT is Wi-Fi, the second RAT is NR, the third RAT is LTE, and the fallback is an EPS fallback.

In some aspects, an apparatus for wireless communication includes means for determining, during an active call on a first RAT, that a signal strength associated with the first RAT is within a particular range above a handover threshold associated with triggering a handover from the first RAT to a second RAT; means for determining, based at least in part on a signal strength of the second RAT, that the active call would be moved from the second RAT to a third RAT after the handover from the first RAT to the second RAT; and means for triggering mobility from the second RAT to the third RAT based at least in part on the determination that the signal strength associated with the first RAT is within the particular range and the determination that the active call would be moved from the second RAT to the third RAT.

In some aspects, the means for triggering the mobility comprises means for configuring a priority of the third RAT to be greater than a priority of the second RAT to cause the apparatus to reselect to the third RAT from the second RAT when the UE is operating in an RRC idle mode.

In some aspects, the means for triggering the mobility comprises means for creating a radio link failure on the second RAT to cause the apparatus to re-establish a link on the third RAT when the UE is operating in an RRC connected mode.

In some aspects, the apparatus includes means for determining that a condition for performing a handover from the first RAT to the third RAT is satisfied, and means for performing the handover from the first RAT to the third RAT based at least in part on determining that the condition is satisfied.

In some aspects, the means for determining that the active call would be moved from the second RAT to the third RAT comprises: means for identifying a stored signal strength at which mobility, associated with the second RAT, was previously triggered, and means for determining that the active call would be moved from the second RAT to the third RAT based at least in part on a determination that the signal strength associated with the second RAT is less than or equal to the stored signal strength.

In some aspects, the identification of the stored signal strength is based at least in part on a cell identifier associated with the second RAT.

In some aspects, the first RAT is Wi-Fi, the second RAT is NR, and the third RAT is LTE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
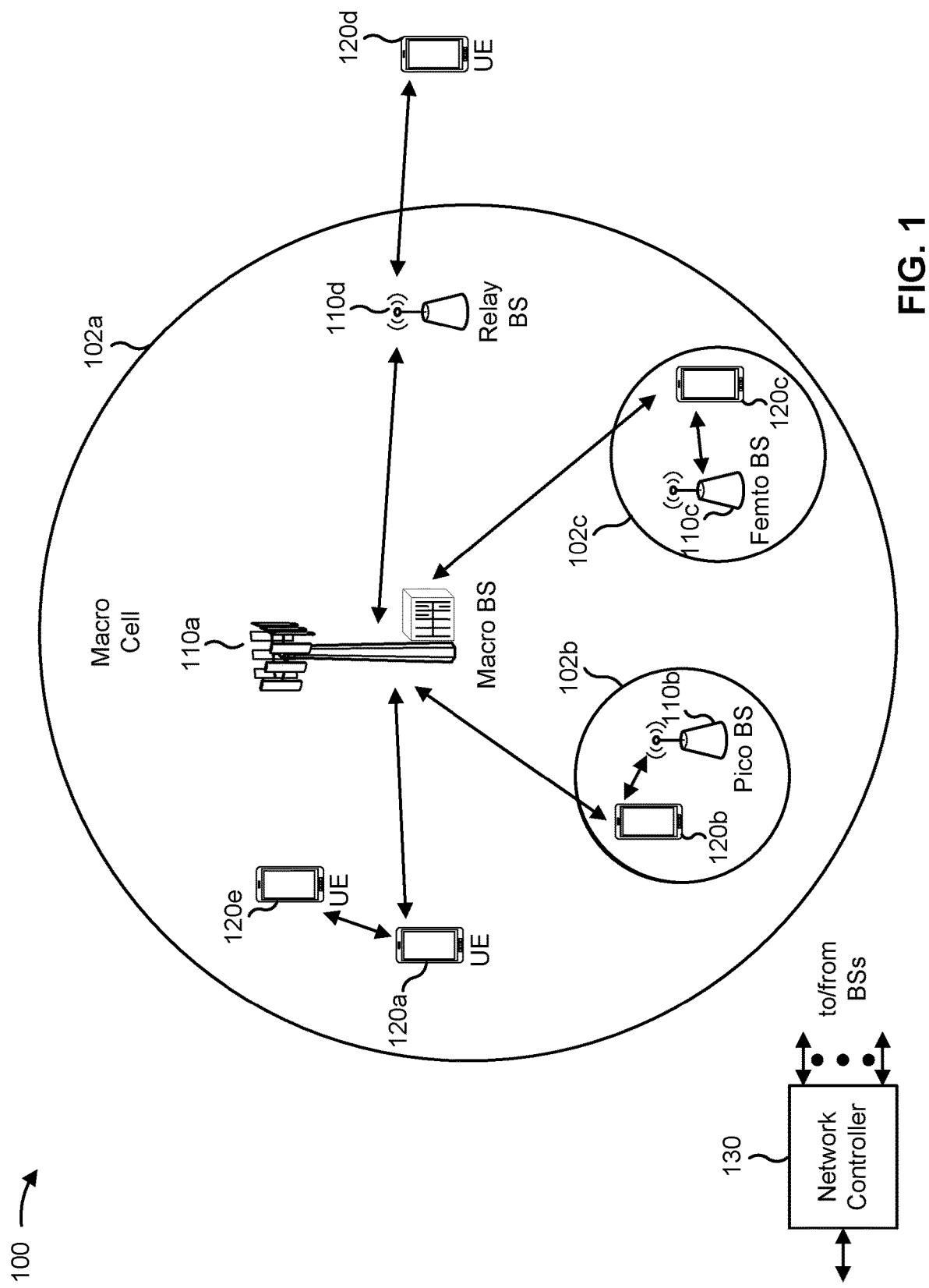
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
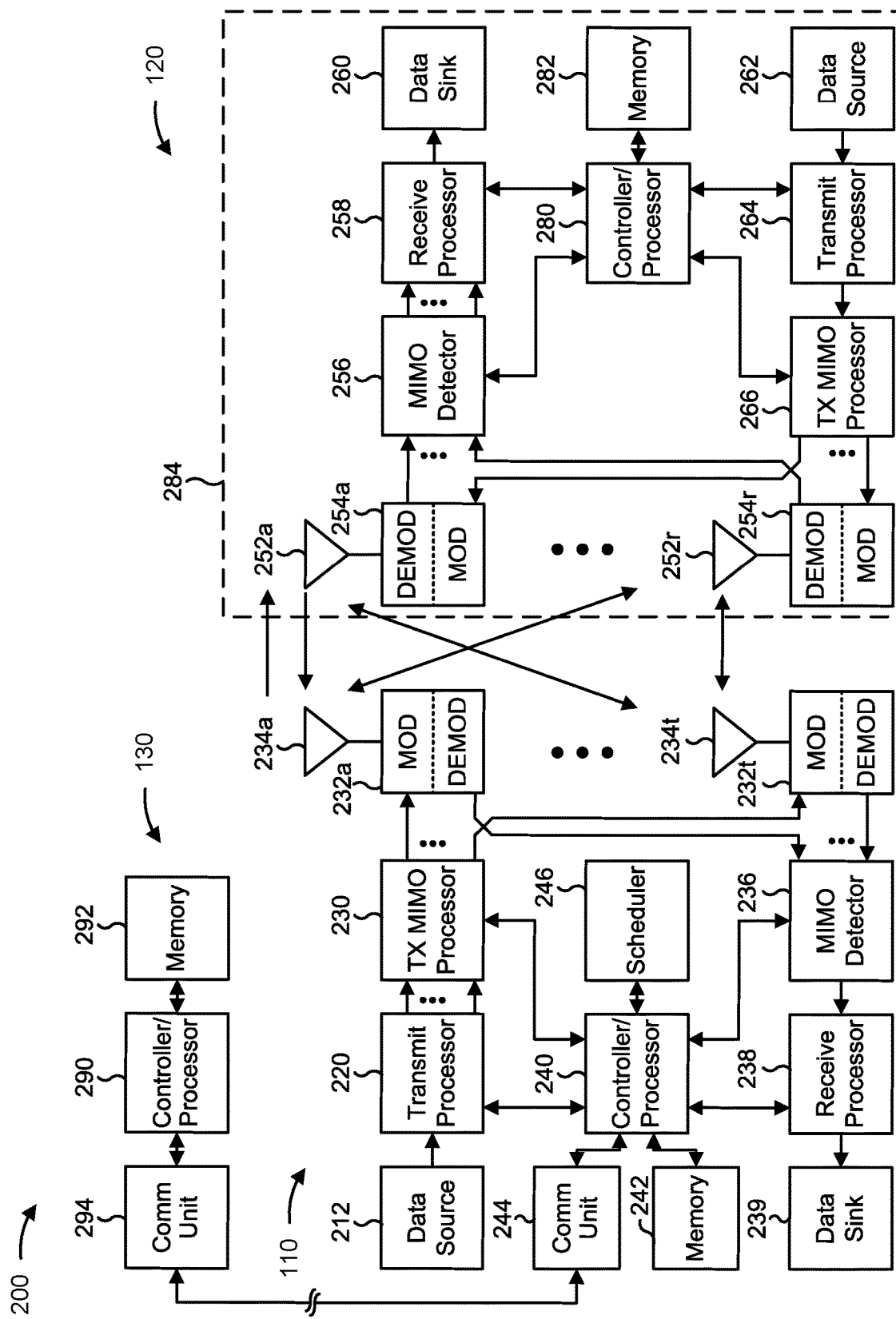
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with improvement of voice over Wi-Fi to voice over cellular handovers, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, UE 120 may include means for determining, during an active call on a first RAT, that a first condition for performing a handover from the first RAT to a second RAT is satisfied; means for determining that the second RAT would trigger a fallback to a third RAT after the handover from the first RAT to the second RAT; means for determining that a second condition for performing a handover from the third RAT to the first RAT is satisfied; means for refraining from performing the handover from the first RAT to the second RAT based at least in part on the determination that the second RAT would trigger the fallback and the determination that the second condition for performing the handover from the third RAT to the first RAT is satisfied; and/or the like. In some aspects, such means may include one or more components of UE 120 described in connection with 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining, during an active call on a first RAT, that a signal strength associated with the first RAT is within a particular range above a handover threshold associated with triggering a handover from the first RAT to a second RAT; means for determining, based at least in part on a signal strength of the second RAT, that the active call would be moved from the second RAT to a third RAT after the handover from the first RAT to the second RAT; means for triggering mobility from the second RAT to the third RAT based at least in part on the determination that the signal strength associated with the first RAT is within the particular range and the determination that the active call would be moved from the second RAT to the third RAT; and/or the like. In some aspects, such means may include one or more components of UE 120 described in connection with 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In some wireless communication scenarios, a UE (e.g., a UE 120) may be triggered to perform a handover from one RAT to another RAT during participation in an active call (e.g., an active voice call). For example, a UE may be triggered to perform a handover from Wi-Fi to NR during participation in an active call. However, in some cases, a handover from one RAT to another RAT during an active call may be problematic.

For example, a UE that is in an active call on Wi-Fi may perform a handover from Wi-Fi to NR. However, in some cases, the NR network may not support voice over NR and, therefore, the NR network may trigger mobility of the UE from NR to LIE shortly after the handover from Wi-Fi to NR. Here, if a condition for triggering a handover from LIE to Wi-Fi is satisfied, then the UE moves the call back to Wi-Fi shortly after the mobility of the UE from NR to LTE. This "ping-pong" of the call (e.g., away from Wi-Fi and back to Wi-Fi) wastes UE resources (e.g., battery power, processing resources, or the like), wastes network resources, and in some cases can degrade call quality. In such a scenario, it is desirable for the UE to refrain from performing the initial handover from Wi-Fi to NR.

As another example, a UE that is in an active call on Wi-Fi may perform a handover from Wi-Fi to NR. However, in some cases, the NR network may determine that a condition for triggering mobility of the UE from NR to LTE is satisfied shortly after the handover from Wi-Fi to NR and, therefore, may trigger mobility of the UE from NR to LIE (e.g., via a packet switched handover (PSHO) or a redirection) shortly after the handover from Wi-Fi to NR. In such a case, it is desirable for the UE to handover from Wi-Fi to LTE directly (rather than from Wi-Fi to NR and then NR to LIE) in order to, for example, improve call quality and reduce UE and/or network resource wastage.

Some techniques and apparatuses described herein enable improvement of voice over Wi-Fi to voice over cellular handovers.

In some aspects, a UE may determine, during an active call on a first RAT (e.g., Wi-Fi), that a first condition for performing a handover from the first RAT to a second RAT (e.g., NR) is satisfied. Next, the UE may determine that the second RAT would trigger a fallback to a third RAT (e.g., LTE) after the handover from the first RAT to the second RAT, and may determine that a second condition for performing a handover from the third RAT to the first RAT is satisfied. Here, the UE may refrain from performing the handover from the first RAT to the second RAT, based at least in part on the determination that the second RAT would trigger the fallback and the determination that the second condition for performing the handover from the third RAT to the first RAT is satisfied. Additional details regarding such example aspects are provided below.

In some aspects, a UE may determine, during an active call on a first RAT (e.g., Wi-Fi), that a signal strength associated with the first RAT is within a particular range above a handover threshold associated with triggering a handover from the first RAT to a second RAT (e.g., NR). Next, the UE may determine, based at least in part on a signal strength of the second RAT, that the active call would be moved from the second RAT to a third RAT (e.g., LTE) after the handover from the first RAT to the second RAT. Here, the UE may trigger mobility from the second RAT to the third RAT based at least in part on the determination that the signal strength associated with the first RAT is within the particular range and the determination that the active call would be moved from the second RAT to the third RAT. Additional details regarding such example aspects are provided below.

In some aspects, these techniques and apparatuses for improving voice over Wi-Fi to voice over cellular handovers reduce wastage of UE resources (e.g., battery power, processing resources, or the like), reduce wastage of network resources, and/or improve quality of an active call of the UE.

Figure 3:
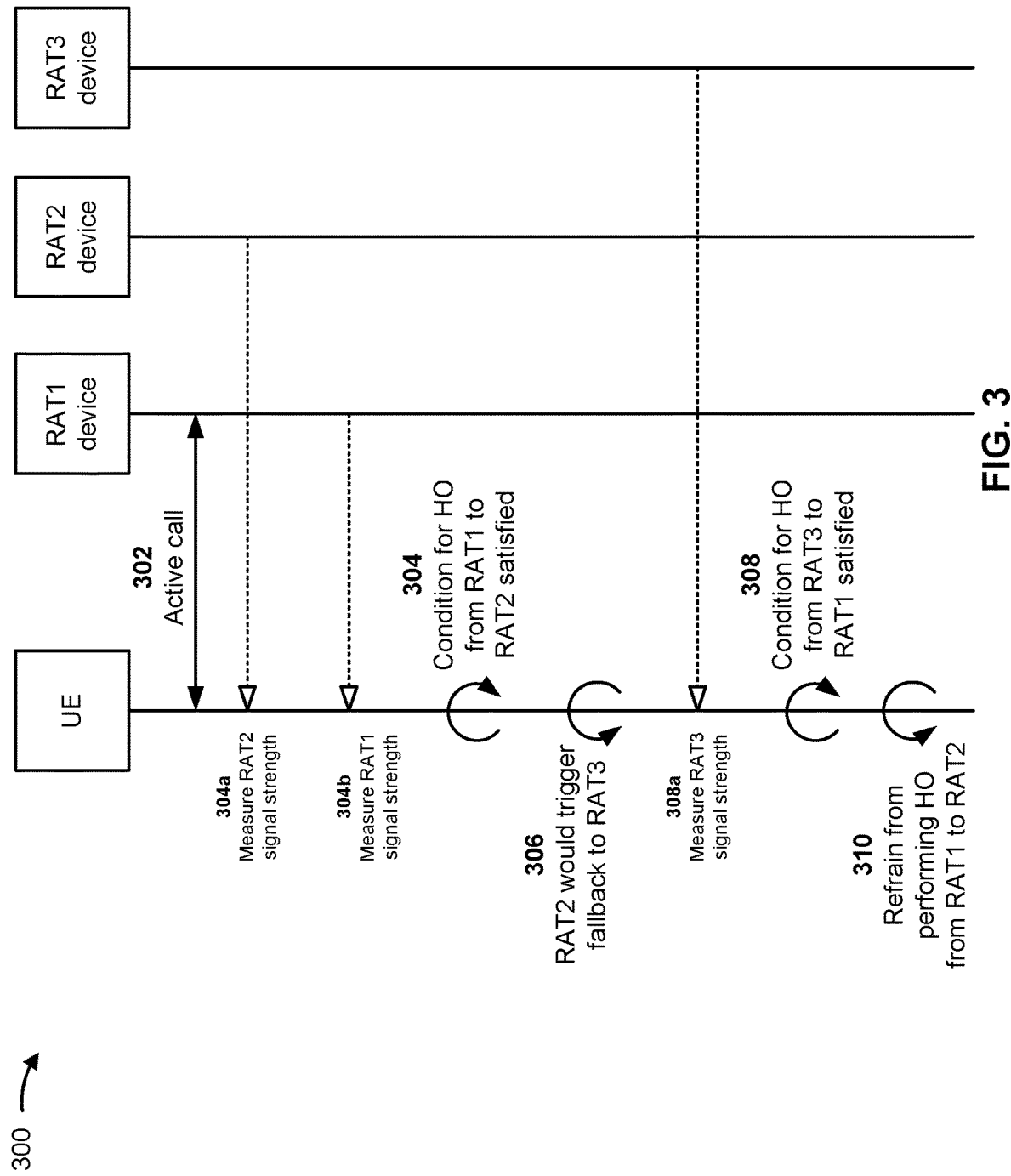
FIG. 3 is a diagram illustrating an example associated with improvement of voice over Wi-Fi to voice over cellular handovers, in accordance with the present disclosure.

FIG. 3 is a diagram illustrating an example 300 associated with improvement of voice over Wi-Fi to voice over cellular handovers, in accordance with the present disclosure.

In example 300, a UE (e.g., UE 120) is in communication with a device that supports a first RAT (identified in FIG. 3 as RAT1 device). In some aspects, the first RAT is Wi-Fi and the device that supports the first RAT may be a Wi-Fi access point. As indicated by reference 302, in example 300, the UE is in an active call (e.g., a voice call, a video call, or the like) on the first RAT.

In some aspects, as shown by reference 304, the UE may determine, during the active call on the first RAT, that a first condition for performing a handover from the first RAT to a second RAT is satisfied. In some aspects, the second RAT is NR. In some aspects, the UE may determine that the first condition is satisfied based at least in part on a preference indicating that the second RAT is preferred over the first RAT for voice calls, a signal strength associated with the first RAT, and/or a signal strength associated with the second RAT.

As a particular example, a device that supports the second RAT (identified in FIG. 3 as RAT2 device, which may be a base station 110 in an NR network) may transmit a reference signal. Here, as shown by reference 304a, the UE may measure a signal strength associated with the second RAT (e.g., a reference signal received power (RSRP)) based at least in part on the reference signal. As shown by reference 304b, the UE may also measure a signal strength associated with the first RAT (e.g., a received signal strength indicator (RSSI)). Here, the first condition may be that the signal strength associated with the first RAT is less than the signal strength associated with the second RAT. Thus, if the UE determines that the signal strength associated with the first RAT is less than the signal strength associated with the second RAT (e.g., by a threshold amount), then the UE may determine that the first condition is satisfied.

In some aspects, as shown by reference 306, the UE may determine that the second RAT would trigger a fallback to a third RAT after the handover from the first RAT to the second RAT. For example, the UE may determine that the second RAT would trigger the UE to switch from utilizing the second RAT for a cellular connection to using the third RAT for a cellular connection after the handover of the active call from the first RAT to the second RAT. In some aspects, the third RAT is LIE and the fallback is an EPS fallback (e.g., a mobility trigger that enables an NR UE to switch to an LTE evolved packet core (EPC) for the active call).

In some aspects, the UE may determine that the second RAT would trigger the fallback based at least in part on a set of cell identifiers, stored by the UE, that identify cells of the second RAT that trigger fallbacks. For example, at a time prior to the active call (e.g., during another active call at an earlier time) the UE may experience a fallback from the second RAT to the third RAT as a result of a cell of the second RAT to which the UE is connected not supporting voice calls. Upon experiencing the fallback associated with the cell of the second RAT, the UE may store a cell identifier of the cell of the second RAT in a database that stores cell identifiers of second RAT cells that have triggered fallbacks. Thus, during the currently active call, the UE may determine a cell identifier of a second RAT cell to which the UE would be connected after a handover from the first RAT to the second RAT, and may determine whether the cell identifier is stored in the database. If the cell identifier is stored in the database, then the UE may determine that the second RAT would trigger a fallback to the third RAT. Notably, if the cell identifier is not stored in the database (indicating that the second RAT cell might support voice calls), then the UE may, in some aspects, proceed with the handover from the first RAT to the second RAT. In some aspects, the UE may determine that the second RAT would trigger the fallback in another manner, such as based at least in part on a signal strength associated with the second RAT (e.g., alone or in combination with the set of cell of cell identifiers stored by the UE), based at least in part on a probability of a fallback as determined by the UE, or in some other manner.

As shown by reference 308, the UE may then determine that a second condition for performing a handover from the third RAT to the first RAT is satisfied. In some aspects, the UE may determine that the second condition is satisfied based at least in part on a signal strength associated with the third RAT.

As a particular example, a device that supports the third RAT (identified in FIG. 3 as RAT3 device, which may be a base station 110 in an LTE network) may transmit a reference signal. Here, as shown by reference 308a, the UE may measure a signal strength associated with the third RAT (e.g., an RSRP) based at least in part on the reference signal. In some aspects, the UE may measure the signal strength associated with the third RAT based at least in part on the determination that the second RAT would trigger the fallback. Here, the second condition may be that the signal strength associated with the third RAT is less than a signal strength threshold. Thus, if the UE determines that the signal strength associated with the third RAT is less than the signal strength threshold, then the UE may determine that the second condition is satisfied.

In some aspects, the UE measures the signal strength associated with the third RAT during an idle time in with the second RAT. For example, when the UE includes a single SIM, the UE may measure the signal strength associated with the third RAT during an idle time in the second RAT. Alternatively, in some aspects, the UE measures the signal strength associated with the third RAT using an RF resource of an unused SIM of the UE. For example, when the UE is a dual SIM UE (e.g., a dual SIM, dual active (DSDA) UE, a dual SIM dual standby (DSDS) UE), the UE may use an RF chain of an unused SIM to measure the signal strength associated with the third RAT.

As shown by reference 310, the UE may refrain from performing the handover from the first RAT to the second RAT based at least in part on the determination that the second RAT would trigger the fallback and the determination that the second condition for performing the handover from the third RAT to the first RAT is satisfied. That is, if the UE (1) determines that the second RAT would trigger the fallback and (2) that the second condition for performing the handover from the third RAT to the first RAT is satisfied, then the UE may refrain from performing the handover from the first RAT to the second RAT. In this way, the UE may prevent a "ping-pong" of the call (e.g., away from the first RAT and back to the first RAT), thereby conserving UE resources (e.g., battery power, processing resources, or the like) and network resources, and improving call quality.

Notably, if the UE determines that the second condition for performing the handover from the third RAT to the first RAT is not satisfied, then the UE may, in some aspects, proceed with the handover from the first RAT to the second RAT (e.g., even when the UE has determined that the second RAT would trigger a fallback).

As indicated above, FIG. 3 is provided as an example. Other examples may differ from what is described with respect to FIG. 3.

Figure 4A:
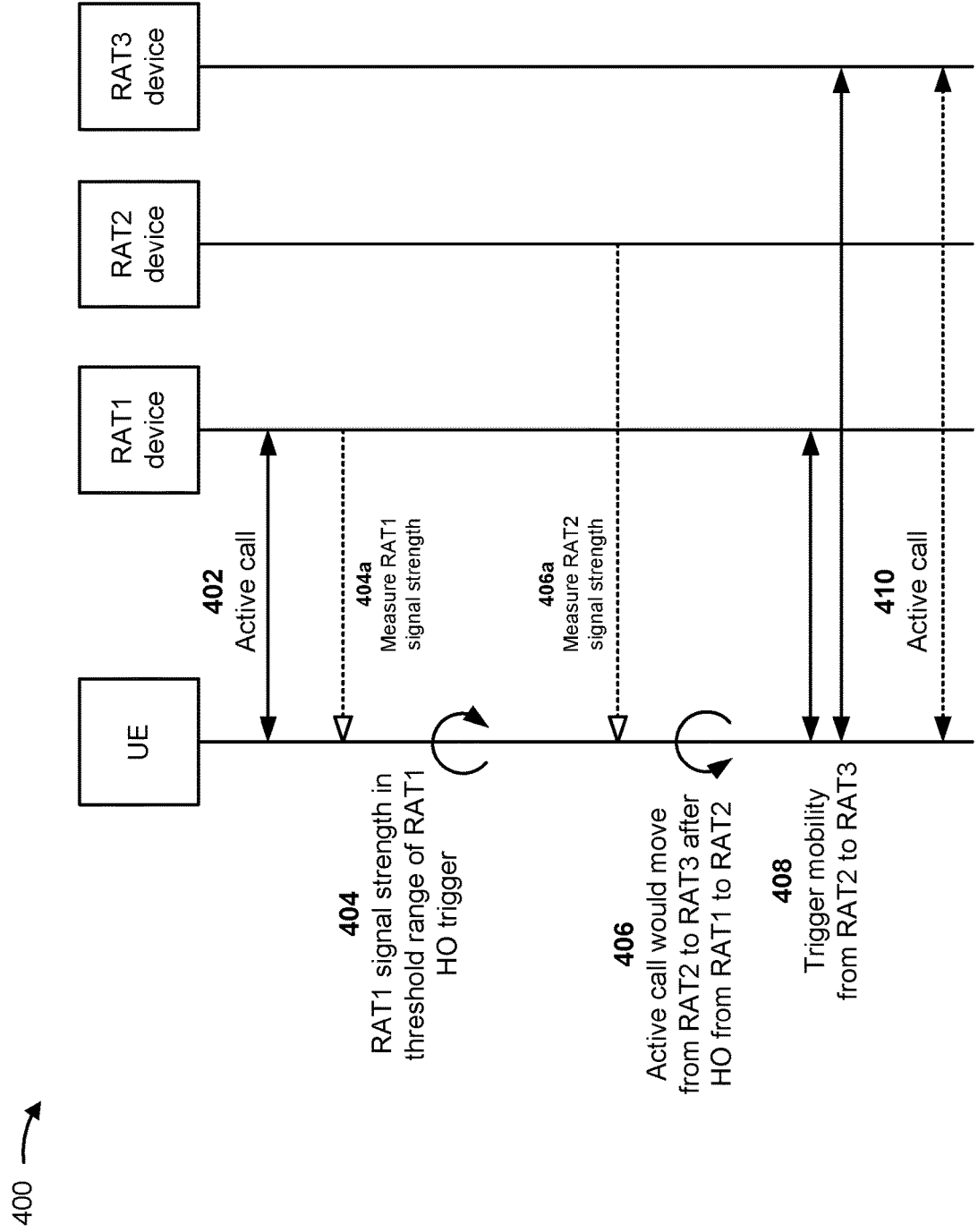
FIGS. 4A and 4B are diagrams illustrating another example associated with improvement of voice over Wi-Fi to voice over cellular handovers, in accordance with the present disclosure.
Figure 4B:
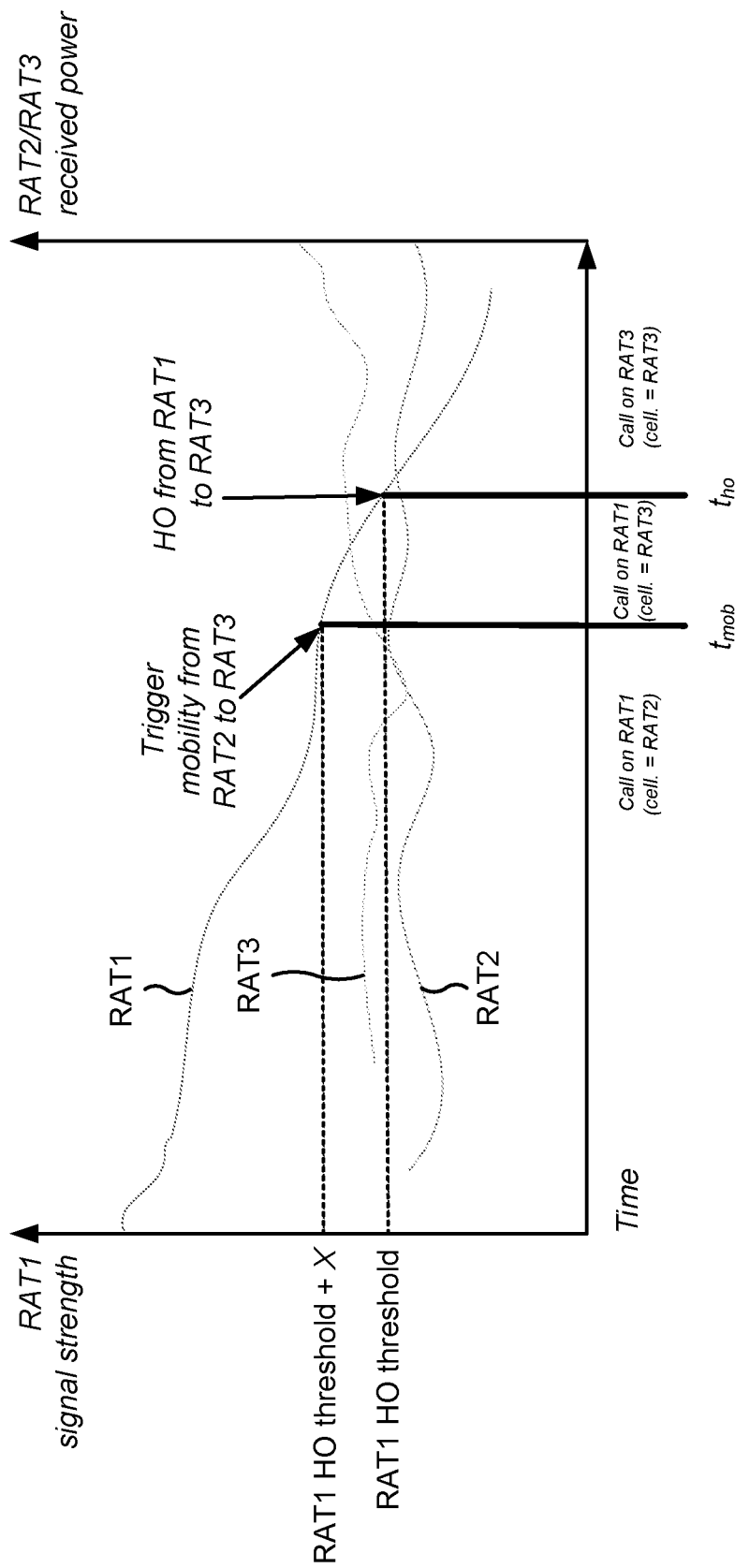

FIGS. 4A and 4B are diagrams illustrating an example 400 associated with improvement of voice over Wi-Fi to voice over cellular handovers, in accordance with the present disclosure.

In example 400, a UE (e.g., UE 120) is in communication with a device that supports a first RAT (identified in FIG. 4A as RAT1 device). In some aspects, the first RAT is Wi-Fi and the device that supports the first RAT may be a Wi-Fi access point. As indicated by reference 402, in example 400, the UE is in an active call on the first RAT and has a cellular connection to a second RAT.

As shown by reference 404, the UE may determine, during the active call on the first RAT, that a signal strength associated with the first RAT is within a particular range above a handover threshold associated with triggering a handover from the first RAT to a second RAT. In some aspects, the second RAT is NR. In one example, as shown by reference 404a, the UE measures a signal strength associated with the first RAT (e.g., an RSSI). Here, the UE may be configured with a handover threshold that is to trigger the UE to perform a handover from the first RAT to the second RAT when the signal strength reaches (e.g., is less than or equal to) a particular value. Further, the UE may be configured with information that identifies a range above the particular value (e.g., +X decibels (dB) above the handover threshold, where X>0). Here, the UE may determine whether the signal strength associated with the first RAT is within the particular range based at least in part on a result of measuring the signal strength associated with the first RAT.

As shown by reference 406, the UE may determine that the active call would be moved from the second RAT to a third RAT after the handover from the first RAT to the second RAT. In some aspects, the third RAT is LIE. In some aspects, the UE may determine that the active call would be moved from the second RAT to the third RAT after the handover from the first RAT to the second RAT based at least in part on a signal strength associated with the second RAT. In some aspects, the UE may determine that the active call would be moved from the second RAT to the third RAT based at least in part on information indicating a signal strength at which mobility, associated with the second RAT, was previously triggered.

As a particular example, mobility of the UE from the second RAT to the third RAT may be triggered at a time prior to the active call (e.g., during another active call at an earlier time). Upon experiencing this mobility, the UE may store a cell identifier of a cell of the second RAT to which the UE was connected, and may also store information indicating a signal strength associated with the second RAT at the time at which the mobility was triggered. The UE may store such information in a database that stores cell identifiers of second RAT cells and signal strengths at times that mobility was triggered from the second RAT cells. Thus, during the currently active call, the UE may determine a cell identifier of a second RAT cell to which the UE would be connected after a handover from the first RAT to the second RAT and may measure a signal strength of the cell associated with the second RAT. For example, a device that supports the second RAT (identified in FIG. 4A as RAT2 device, which may be a base station 110 in an NR network) may transmit a reference signal and, as shown by reference 406a, the UE may measure a signal strength associated with the second RAT (e.g., an RSRP) based at least in part on the reference signal. Next, the UE may determine, based at least in part on information stored by the UE, whether the measured signal strength associated with the cell of the second RAT is at or below a stored signal strength of the cell of the second RAT at a time that mobility was previously triggered. Here, if the UE determines that the measured signal strength associated with the second RAT is at or below the stored signal strength, then the UE may determine that the active call would be moved from the second RAT to a third RAT after the handover from the first RAT to the second RAT. Notably, if the cell identifier is not stored in the database (indicating that the UE has not experienced mobility from the cell of the second RAT), then the UE may in some aspects proceed with the handover from the first RAT to the second RAT.

As shown by reference 408, the UE may trigger mobility from the second RAT to the third RAT based at least in part on the determination that the signal strength associated with the first RAT is within the particular range and the determination that the active call would be moved from the second RAT to the third RAT. That is, if the UE (1) determines that the signal strength associated with the first RAT is within the particular range and (2) that the active call would be moved from the second RAT to the third RAT, then the UE may trigger mobility from the second RAT to the third RAT. Notably, in some aspects, the active call is not moved from the first RAT to the third RAT at the time that the UE triggers mobility from the second RAT to the third RAT (i.e., the active call may remain on the first RAT after the UE triggers mobility from the second RAT to the third RAT).

In some aspects, the UE may trigger the mobility by configuring a priority of the third RAT to be greater than a priority of the second RAT. The UE may configure the priority of the third RAT to be greater than the priority of the second RAT when, for example, the UE is operating in an RRC idle mode. In some aspects, a result of such a configuration causes the UE to reselect to the third RAT from the second RAT.

In some aspects, the UE may trigger the mobility by creating a radio link failure on the second RAT. The UE may create the radio link failure on the second RAT when, for example, the UE is operating in an RRC connected mode. In some aspects, a result of creating the radio link failure causes the UE to re-establish a link on the third RAT.

In this way, the UE may prevent back-to-back handovers (e.g., from Wi-Fi to NR and then from NR to LTE), thereby conserving UE resources (e.g., battery power, processing resources, or the like) and network resources, and improving call quality. Notably, according to the technique described above, the UE triggers the mobility from the second RAT to the third RAT (rather than the network triggering the mobility form the second RAT to the third RAT).

In some aspects, after triggering the mobility from the second RAT to the third RAT, the UE may perform a handover from the first RAT to the third RAT. For example, as indicated by reference 410 and after triggering the mobility from the second RAT to the third RAT, the UE may determine that a condition for performing a handover from the first RAT to the third RAT is satisfied (e.g., based at least in part on a signal strength of the first RAT reaching a handover threshold). The UE may then perform the handover from the first RAT to the third RAT based at least in part on determining that the condition is satisfied.

FIG. 4B is a graphical illustration of the scenario described in association with example 400. In the example shown in FIG. 4B, the UE, during an active call on the first RAT, determines at time $t_{mob}$ that a signal strength associated with the first RAT is within a particular range (+X) above a handover threshold (RAT1 HO threshold) associated with triggering a handover from the first RAT to the second RAT. Here, the UE determines (e.g., based at least in part on a signal strength of the second RAT and stored information associated with the second RAT, as described above) that the active call would be moved from the second RAT to a third RAT after the handover from the first RAT to the second RAT. Thus, the UE triggers mobility from the second RAT to the third RAT.

As further shown, the UE may perform a handover from the first RAT to the third RAT at time $t_{ho}$ after triggering the mobility from the second RAT to the third RAT. That is, the UE may perform one or more operations that cause the active call to be handed over (e.g., moved from) the first RAT to the third RAT at time $t_{ho}$ after the UE triggers the mobility of the UE from the second RAT to the third RAT (e.g., after the UE moves from using the second RAT for a cellular connection to using the third RAT for a cellular connection). For example, the UE may determine that a condition for performing a handover from the first RAT to the third RAT is satisfied (e.g., that the signal strength associated with the first RAT is at or below the RAT1 HO threshold), and may perform the handover, accordingly.

As shown in FIG. 4B, the call is on the first RAT and the UE utilizes the second RAT for a cellular connection before time $t_{mob}$. Further, between time $t_{mob}$ and time $t_{ho}$, the call is on the first RAT and the UE utilizes the third RAT for a cellular connection. Finally, the call is on the third RAT and the UE utilizes the third RAT for a cellular connection after time $t_{ho}$. Notably, in this scenario, only one handover is performed (from the first RAT to the third RAT).

As indicated above, FIGS. 4A and 4B are provided as examples. Other examples may differ from what is described with respect to FIGS. 4A and 4B.

Figure 5:
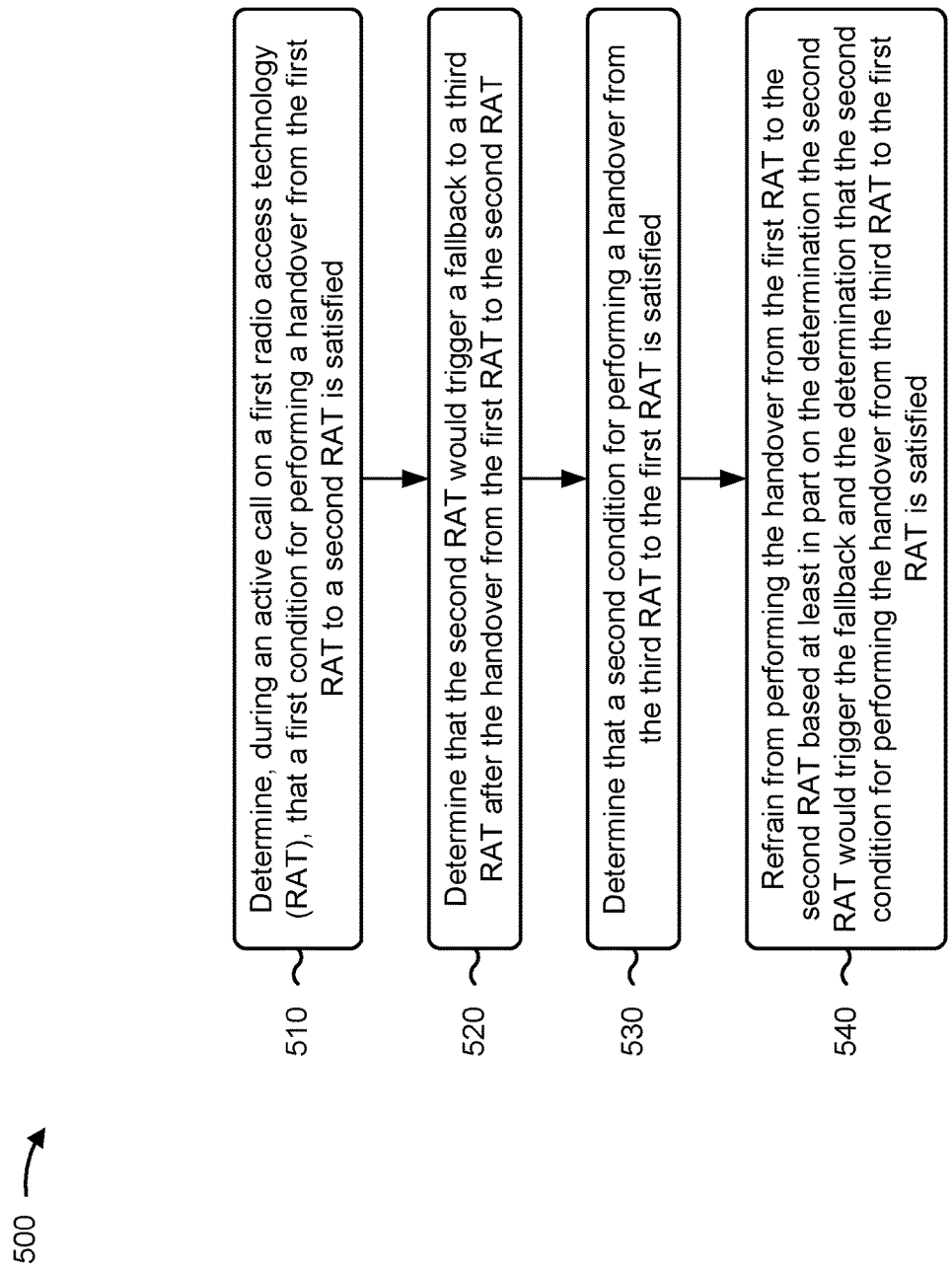
FIGS. 5 and 6 are diagrams illustrating example processes associated with improvement of voice over Wi-Fi to voice over cellular handovers, in accordance with the present disclosure.

FIG. 5 is a diagram illustrating an example process 500 performed, for example, by a UE, in accordance with the present disclosure. Example process 500 is an example where the UE (e.g., UE 120) performs operations associated with improvement of voice over Wi-Fi to voice over cellular handovers.

As shown in FIG. 5, in some aspects, process 500 may include determining, during an active call on a first RAT, that a first condition for performing a handover from the first RAT to a second RAT is satisfied (block 510). For example, the UE (e.g., using determination component 708, depicted in FIG. 7) may determine, during an active call on a first RAT, that a first condition for performing a handover from the first RAT to a second RAT is satisfied, as described above.

As further shown in FIG. 5, in some aspects, process 500 may include determining that the second RAT would trigger a fallback to a third RAT after the handover from the first RAT to the second RAT (block 520). For example, the UE (e.g., using determination component 708, depicted in FIG. 7) may determine that the second RAT would trigger a fallback to a third RAT after the handover from the first RAT to the second RAT, as described above.

As further shown in FIG. 5, in some aspects, process 500 may include determining that a second condition for performing a handover from the third RAT to the first RAT is satisfied (block 530). For example, the UE (e.g., using determination component 708, depicted in FIG. 7) may determine that a second condition for performing a handover from the third RAT to the first RAT is satisfied, as described above.

As further shown in FIG. 5, in some aspects, process 500 may include refraining from performing the handover from the first RAT to the second RAT based at least in part on the determination that the second RAT would trigger the fallback and the determination that the second condition for performing the handover from the third RAT to the first RAT is satisfied (block 540). For example, the UE (e.g., using handover component 712, depicted in FIG. 7) may refrain from performing the handover from the first RAT to the second RAT based at least in part on the determination that the second RAT would trigger the fallback and the determination that the second condition for performing the handover from the third RAT to the first RAT is satisfied, as described above.

Process 500 may include additional aspects, such as any single aspect or any combination of aspects described below and/or in connection with one or more other processes described elsewhere herein.

In a first aspect, the determination that the first condition for performing the handover from the first RAT to the second RAT is satisfied is based at least in part on at least one of a preference indicating that the second RAT is preferred over the first RAT for voice calls, a signal strength associated with the first RAT, or a signal strength associated with the second RAT.

In a second aspect, alone or in combination with the first aspect, determining that the second RAT would trigger the fallback comprises determining that a cell identifier associated with the second RAT is included in a set of stored cell identifiers that identifies cells of the second RAT that trigger fallbacks.

In a third aspect, alone or in combination with one or more of the first and second aspects, process 500 includes determining that the second RAT has triggered a fallback at a time prior to the active call, and storing a cell identifier associated with the second RAT in a set of stored cell identifiers that identifies cells of the second RAT that have triggered fallbacks.

In a fourth aspect, alone or in combination with one or more of the first through third aspects, the determination that the second condition for performing the handover from the third RAT to the first RAT is satisfied is based at least in part on a signal strength associated with the third RAT.

In a fifth aspect, alone or in combination with one or more of the first through fourth aspects, process 500 includes measuring (e.g., using the measurement component 710, depicted in FIG. 7) a signal strength associated with the third RAT based at least in part on the determination that the second RAT would trigger the fallback.

In a sixth aspect, alone or in combination with one or more of the first through fifth aspects, the signal strength associated with the third RAT is measured during an idle time in the second RAT.

In a seventh aspect, alone or in combination with one or more of the first through sixth aspects, the signal strength associated with the third RAT is measured using an RF resource of an unused SIM of the UE.

In an eighth aspect, alone or in combination with one or more of the first through seventh aspects, the first RAT is Wi-Fi, the second RAT is NR, the third RAT is LI and the fallback is an EPS fallback.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
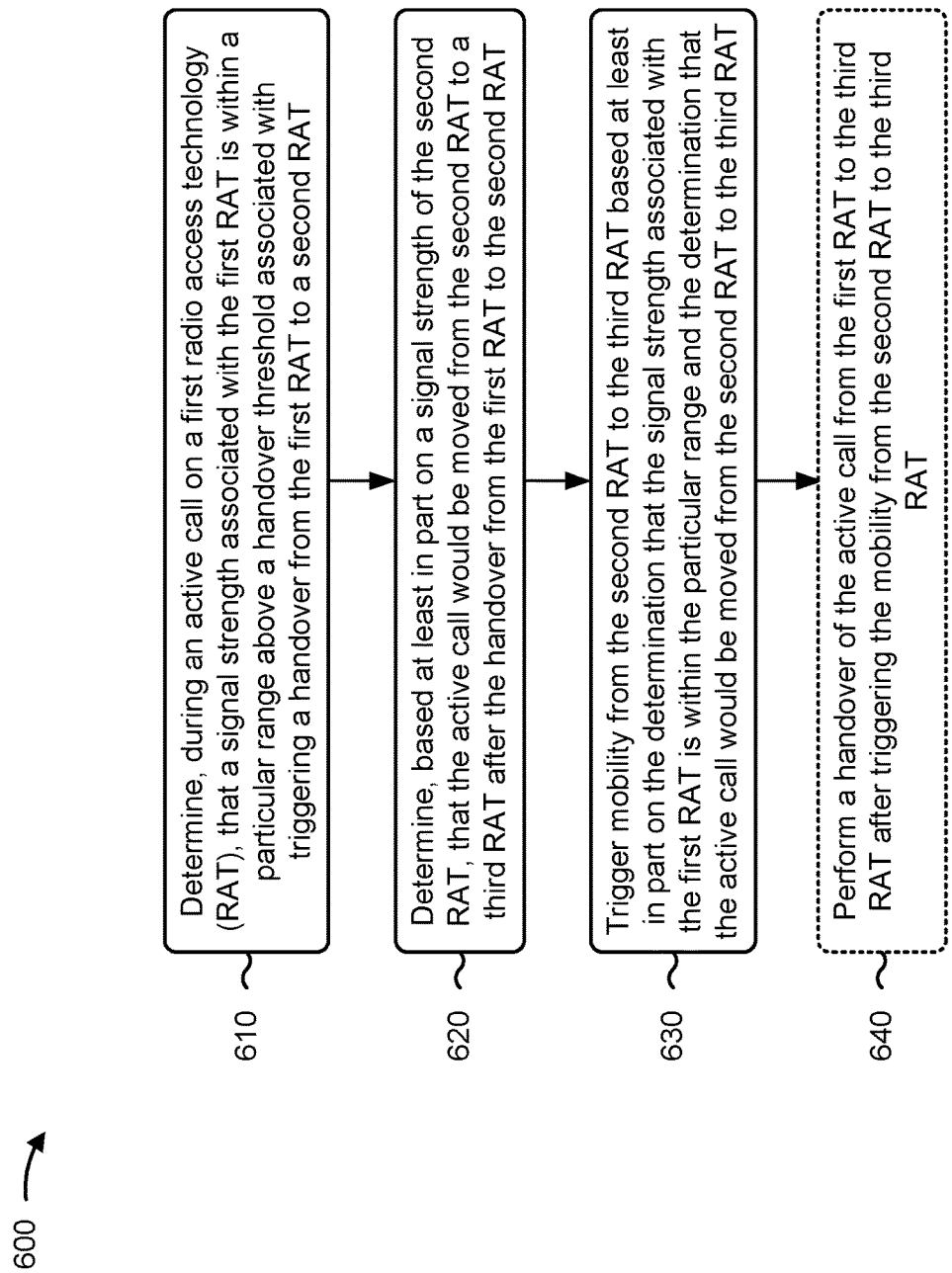

FIG. 6 is a diagram illustrating an example process 600 performed, for example, by a UE, in accordance with the present disclosure. Example process 600 is an example where the UE (e.g., UE 120) performs operations associated with techniques for improvement of voice over Wi-Fi to voice over cellular handovers.

As shown in FIG. 6, in some aspects, process 600 may include determining, during an active call on a first RAT, that a signal strength associated with the first RAT is within a particular range above a handover threshold associated with triggering a handover from the first RAT to a second RAT (block 610). For example, the UE (e.g., using determination component 808, depicted in FIG. 8) may determine, during an active call on a first RAT, that a signal strength associated with the first RAT is within a particular range above a handover threshold associated with triggering a handover from the first RAT to a second RAT, as described above.

As further shown in FIG. 6, in some aspects, process 600 may include determining, based at least in part on a signal strength of the second RAT, that the active call would be moved from the second RAT to a third RAT after the handover from the first RAT to the second RAT (block 620). For example, the UE (e.g., using determination component 808, depicted in FIG. 8) may determine, based at least in part on a signal strength of the second RAT, that the active call would be moved from the second RAT to a third RAT after the handover from the first RAT to the second RAT, as described above.

As further shown in FIG. 6, in some aspects, process 600 may include triggering mobility from the second RAT to the third RAT based at least in part on the determination that the signal strength associated with the first RAT is within the particular range and the determination that the active call would be moved from the second RAT to the third RAT (block 630). For example, the UE (e.g., using mobility triggering component 810, depicted in FIG. 8) may trigger mobility from the second RAT to the third RAT based at least in part on the determination that the signal strength associated with the first RAT is within the particular range and the determination that the active call would be moved from the second RAT to the third RAT, as described above.

As further shown in FIG. 6, in some aspects, process 600 may optionally include performing a handover of the active call from the first RAT to the third RAT after triggering the mobility from the second RAT to the third RAT (block 640).

For example, the UE (e.g., using handover component 812, depicted in FIG. 8) may perform a handover of the active call from the first RAT to the third RAT after triggering the mobility from the second RAT to the third RAT, as described above.

Process 600 may include additional aspects, such as any single aspect or any combination of aspects described below and/or in connection with one or more other processes described elsewhere herein.

In a first aspect, triggering the mobility comprises configuring a priority of the third RAT to be greater than a priority of the second RAT to cause the UE to reselect to the third RAT from the second RAT when the UE is operating in an RRC idle mode.

In a second aspect, alone or in combination with the first aspect, triggering the mobility comprises creating a radio link failure on the second RAT to cause the UE to re-establish a link on the third RAT when the UE is operating in a radio resource control (RRC) connected mode.

In a third aspect, alone or in combination with one or more of the first and second aspects, process 600 includes determining that a condition for performing a handover from the first RAT to the third RAT is satisfied, and performing (e.g., using handover component 812) the handover from the first RAT to the third RAT based at least in part on determining that the condition is satisfied.

In a fourth aspect, alone or in combination with one or more of the first through third aspects, the determination that the active call would be moved from the second RAT to the third RAT comprises identifying a stored signal strength at which mobility, associated with the second RAT, was previously triggered, and determining that the active call would be moved from the second RAT to the third RAT based at least in part on a determination that the signal strength associated with the second RAT is less than or equal to the stored signal strength.

In a fifth aspect, alone or in combination with one or more of the first through fourth aspects, the identification of the stored signal strength is based at least in part on a cell identifier associated with the second RAT.

In a sixth aspect, alone or in combination with one or more of the first through fifth aspects, the first RAT is Wi-Fi, the second RAT is NR, and the third RAT is LTE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
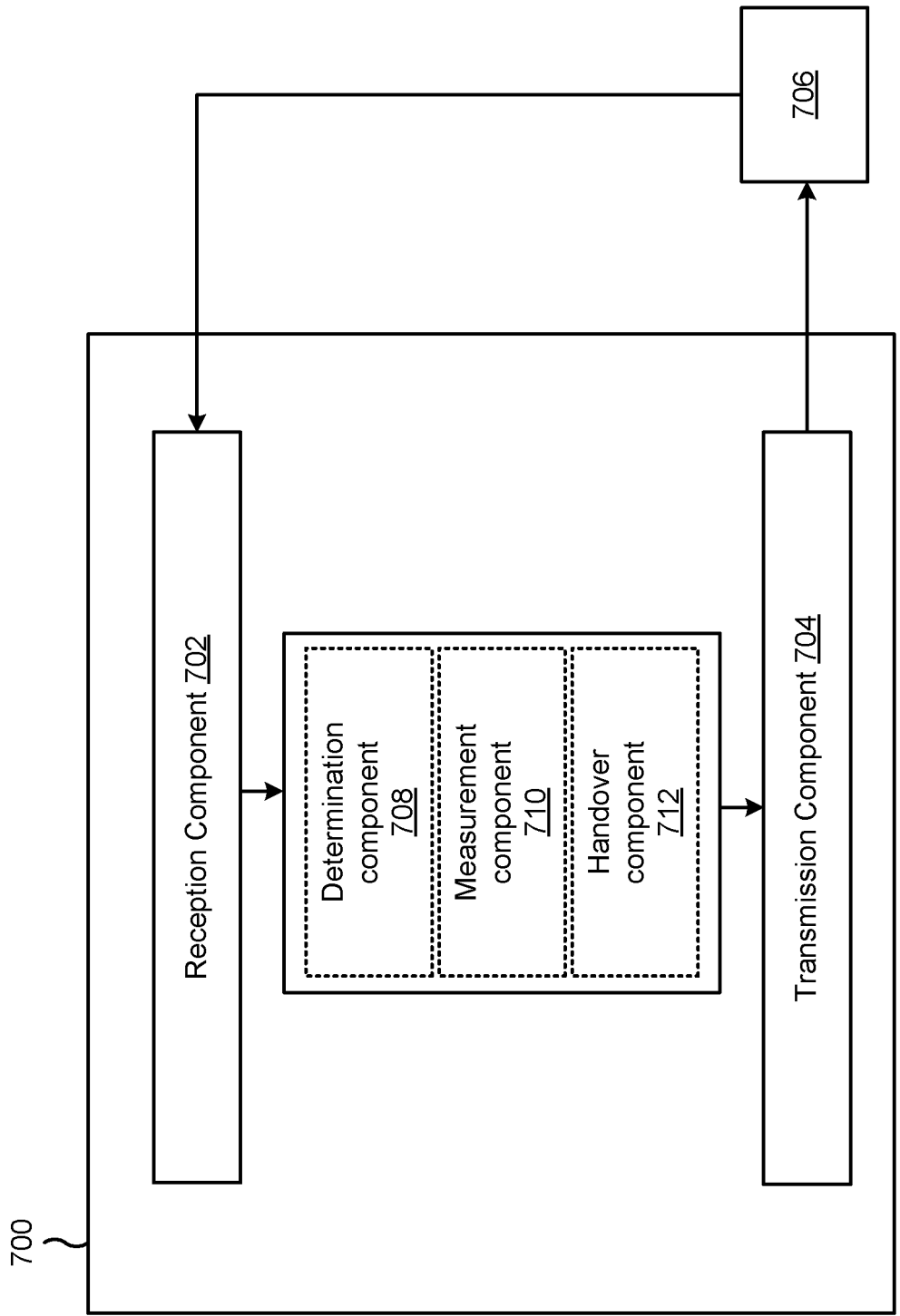
FIGS. 7 and 8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a determination component 708, a measurement component 710, or a handover component 712, among other examples.

In some aspects, the apparatus 700 may be configured to perform one or more operations described herein in connection with FIG. 3. Additionally or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The determination component 708 may determine, during an active call on a first RAT, that a first condition for performing a handover from the first RAT to a second RAT is satisfied. In some aspects, the determination component 708 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 708 may determine that the second RAT would trigger a fallback to a third RAT after the handover from the first RAT to the second RAT. The determination component 708 may determine that a second condition for performing a handover from the third RAT to the first RAT is satisfied. The handover component 712 may refrain from performing the handover from the first RAT to the second RAT based at least in part on the determination that the second RAT would trigger the fallback and the determination that the second condition for performing the handover from the third RAT to the first RAT is satisfied. In some aspects, the handover component 712 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 708 may determine that the second RAT has triggered a fallback at a time prior to the active call.

The determination component 708 may store a cell identifier associated with the second RAT in a set of stored cell identifiers that identifies cells of the second RAT that have triggered fallbacks.

The measurement component 710 may measure a signal strength associated with the third RAT based at least in part on the determination that the second RAT would trigger the fallback. In some aspects, the measurement component 710 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

Figure 8:
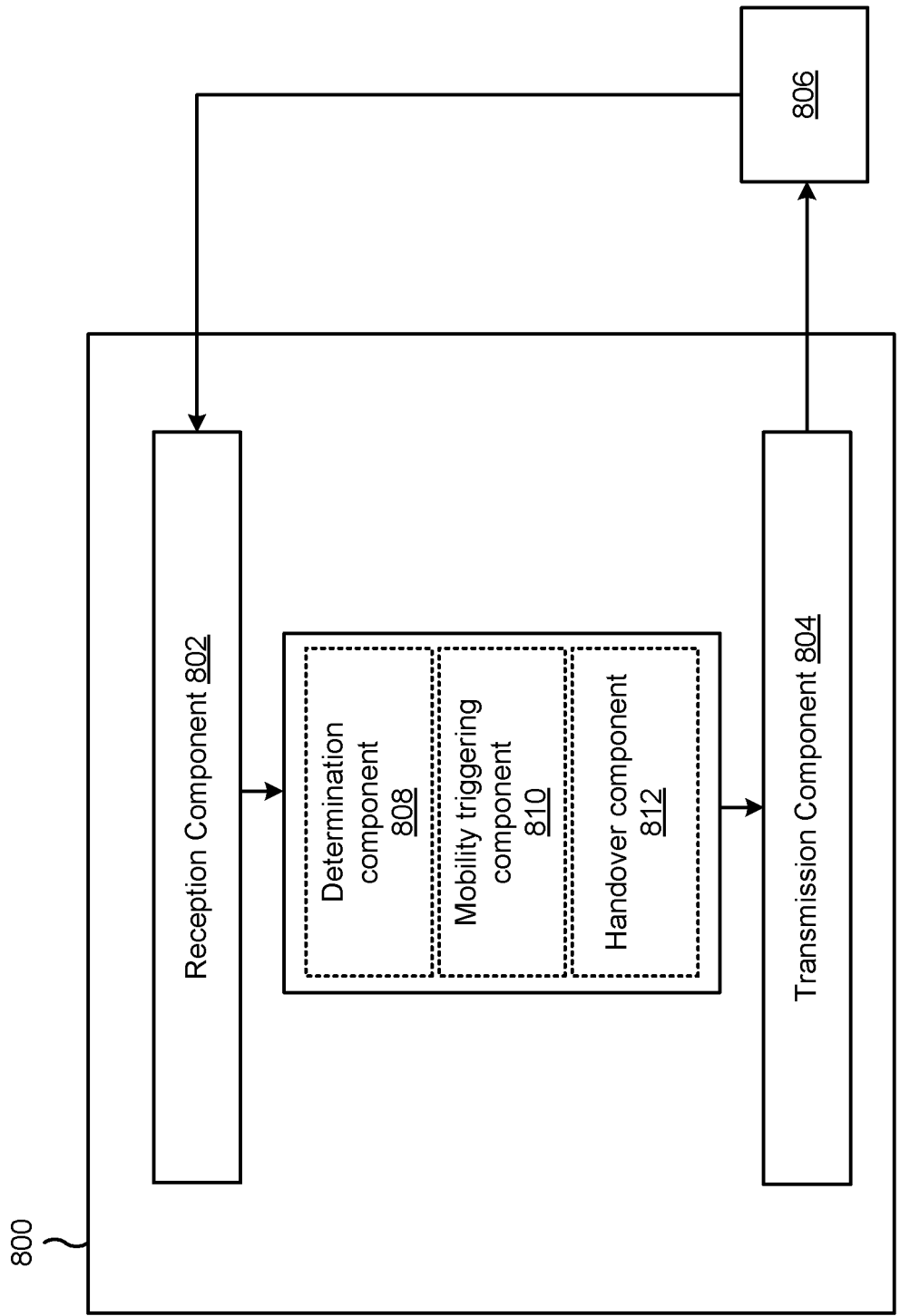

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include one or more of a determination component 808, a mobility triggering component 810, or a handover component 812, among other examples.

In some aspects, the apparatus 800 may be configured to perform one or more operations described herein in connection with FIGS. 4A and 4B. Additionally or alternatively, the apparatus 800 may be configured to perform one or more processes described herein, such as process 600 of FIG. 6. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The determination component 808 may determine, during an active call on a first RAT, that a signal strength associated with the first RAT is within a particular range above a handover threshold associated with triggering a handover from the first RAT to a second RAT. In some aspects, the determination component 808 may include one or more antennas, a demodulator, a MIMO detector, a receive processor, a modulator, a transmit MIMO processor, a transmit processor, a controller/processor, a memory, or a combination thereof, of the UE described above in connection with FIG. 2. The determination component 808 may determine, based at least in part on a signal strength of the second RAT, that the active call would be moved from the second RAT to a third RAT after the handover from the first RAT to the second RAT. The mobility triggering component 810 may trigger mobility from the second RAT to the third RAT based at least in part on the determination that the signal strength associated with the first RAT is within the particular range and the determination that the active call would be moved from the second RAT to the third RAT. In some aspects, the mobility triggering component 810 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The determination component 808 may determine that a condition for performing a handover from the first RAT to the third RAT is satisfied.

The handover component 812 may perform the handover from the first RAT to the third RAT based at least in part on determining that the condition is satisfied. In some aspects, the handover component 812 may include one or more antennas, a demodulator, a MIMO detector, a receive processor, a modulator, a transmit MIMO processor, a transmit processor, a controller/processor, a memory, or a combination thereof, of the UE described above in connection with FIG. 2.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: determining, during an active call on a first RAT, that a first condition for performing a handover from the first RAT to a second RAT is satisfied; determining that the second RAT would trigger a fallback to a third RAT after the handover from the first RAT to the second RAT; determining that a second condition for performing a handover from the third RAT to the first RAT is satisfied; and refraining from performing the handover from the first RAT to the second RAT based at least in part on the determination that the second RAT would trigger the fallback and the determination that the second condition for performing the handover from the third RAT to the first RAT is satisfied.

Aspect 2: The method of Aspect 1, wherein the determination that the first condition for performing the handover from the first RAT to the second RAT is satisfied is based at least in part on at least one of: a preference indicating that the second RAT is preferred over the first RAT for voice calls, a signal strength associated with the first RAT, or a signal strength associated with the second RAT.

Aspect 3: The method of any of Aspects 1-2, wherein determining that the second RAT would trigger the fallback comprises: determining that a cell identifier associated with the second RAT is included in a set of stored cell identifiers that identifies cells of the second RAT that trigger fallbacks.

Aspect 4: The method of any of Aspects 1-3, further comprising: determining that the second RAT has triggered a fallback at a time prior to the active call, and storing a cell identifier associated with the second RAT in a set of stored cell identifiers that identifies cells of the second RAT that have triggered fallbacks.

Aspect 5: The method of any of Aspects 1-4, wherein the determination that the second condition for performing the handover from the third RAT to the first RAT is satisfied is based at least in part on a signal strength associated with the third RAT.

Aspect 6: The method of any of Aspects 1-5, further comprising: measuring a signal strength associated with the third RAT based at least in part on the determination that the second RAT would trigger the fallback.

Aspect 7: The method of Aspect 6, wherein the signal strength associated with the third RAT is measured during an idle time in the second RAT.

Aspect 8: The method of any of Aspects 6-7, wherein the signal strength associated with the third RAT is measured using an RF resource of an unused SIM of the UE.

Aspect 9: The method of any of Aspects 1-8, wherein the first RAT is Wi-Fi, the second RAT is NR, the third RAT is LTE, and the fallback is an EPS fallback.

Aspect 10: A method of wireless communication performed by a UE, comprising: determining, during an active call on a first RAT, that a signal strength associated with the first RAT is within a particular range above a handover threshold associated with triggering a handover from the first RAT to a second RAT; determining, based at least in part on a signal strength of the second RAT, that the active call would be moved from the second RAT to a third RAT after the handover from the first RAT to the second RAT; and triggering mobility from based at least in part on the determination that the signal strength associated with the first RAT is within the particular range and the determination that the active call would be moved from the second RAT to the third RAT.

Aspect 11: The method of Aspect 10, wherein triggering the mobility comprises configuring a priority of the third RAT to be greater than a priority of the second RAT to cause the UE to reselect to the third RAT from the second RAT when the UE is operating in an RRC idle mode.

Aspect 12: The method of any of Aspects 10-11, wherein triggering the mobility comprises creating a radio link failure on the second RAT to cause the UE to re-establish a link on the third RAT when the UE is operating in an RRC connected mode.

Aspect 13: The method of any of Aspects 10-12, further comprising: determining that a condition for performing a handover from the first RAT to the third RAT is satisfied, and performing the handover from the first RAT to the third RAT based at least in part on determining that the condition is satisfied.

Aspect 14: The method of any of Aspects 10-13, wherein the determination that the active call would be moved from the second RAT to the third RAT comprises: identifying a stored signal strength at which mobility, associated with the second RAT, was previously triggered, and determining that the active call would be moved from the second RAT to the third RAT based at least in part on a determination that the signal strength associated with the second RAT is less than or equal to the stored signal strength.

Aspect 15: The method of Aspect 14, wherein the identification of the stored signal strength is based at least in part on a cell identifier associated with the second RAT.

Aspect 16: The method of any of Aspects 10-15, wherein the first RAT is Wi-Fi, the second RAT is NR, and the third RAT is LTE.

Aspect 17: An apparatus for wireless communication at a device, comprising a processor; memory coupled with the processor; and instructions stored in the memory and executable by the processor to cause the apparatus to perform the method of one or more of Aspects 1-9.

Aspect 18: A device for wireless communication, comprising a memory and one or more processors coupled to the memory, the one or more processors configured to perform the method of one or more of Aspects 1-9.

Aspect 19: An apparatus for wireless communication, comprising at least one means for performing the method of one or more of Aspects 1-9.

Aspect 20: A non-transitory computer-readable medium storing code for wireless communication, the code comprising instructions executable by a processor to perform the method of one or more of Aspects 1-9.

Aspect 21: A non-transitory computer-readable medium storing a set of instructions for wireless communication, the set of instructions comprising one or more instructions that, when executed by one or more processors of a device, cause the device to perform the method of one or more of Aspects 1-9.

Aspect 22: An apparatus for wireless communication at a device, comprising a processor; memory coupled with the processor; and instructions stored in the memory and executable by the processor to cause the apparatus to perform the method of one or more of Aspects 10-16.

Aspect 23: A device for wireless communication, comprising a memory and one or more processors coupled to the memory, the one or more processors configured to perform the method of one or more of Aspects 10-16.

Aspect 24: An apparatus for wireless communication, comprising at least one means for performing the method of one or more of Aspects 10-16.

Aspect 25: A non-transitory computer-readable medium storing code for wireless communication, the code comprising instructions executable by a processor to perform the method of one or more of Aspects 10-16.

Aspect 26: A non-transitory computer-readable medium storing a set of instructions for wireless communication, the set of instructions comprising one or more instructions that, when executed by one or more processors of a device, cause the device to perform the method of one or more of Aspects 10-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining, during an active call on a first radio access technology (RAT), that a first condition for performing a handover from the first RAT to a second RAT is satisfied;
    determining that the second RAT would trigger a fallback to a third RAT after the handover from the first RAT to the second RAT;
    determining that a second condition for performing a handover from the third RAT to the first RAT is satisfied; and
    refraining from performing the handover from the first RAT to the second RAT based at least in part on the determination that the second RAT would trigger the fallback and the determination that the second condition for performing the handover from the third RAT to the first RAT is satisfied.

2. The method of claim 1, wherein the determination that the first condition for performing the handover from the first RAT to the second RAT is satisfied is based at least in part on at least one of:

a preference indicating that the second RAT is preferred over the first RAT for voice calls, a signal strength associated with the first RAT, or a signal strength associated with the second RAT.

3. The method of claim 1, wherein determining that the second RAT would trigger the fallback comprises:

determining that a cell identifier associated with the second RAT is included in a set of stored cell identifiers that identifies cells of the second RAT that trigger fallbacks.

4. The method of claim 1, further comprising:

determining that the second RAT has triggered a fallback at a time prior to the active call, and storing a cell identifier associated with the second RAT in a set of stored cell identifiers that identifies cells of the second RAT that have triggered fallbacks.

5. The method of claim 1, wherein the determination that the second condition for performing the handover from the third RAT to the first RAT is satisfied is based at least in part on a signal strength associated with the third RAT.

6. The method of claim 1, further comprising:

measuring a signal strength associated with the third RAT based at least in part on the determination that the second RAT would trigger the fallback.

7. The method of claim 6, wherein the signal strength associated with the third RAT is measured during an idle time in the second RAT.

8. The method of claim 6, wherein the signal strength associated with the third RAT is measured using a radio frequency (RF) resource of an unused subscriber identification module (SIM) of the UE.

9. The method of claim 1, wherein the first RAT is Wi-Fi, the second RAT is New Radio (NR), the third RAT is Long Term Evolution (LTE), and the fallback is an Evolved Packet System (EPS) fallback.

10. A user equipment (UE) for wireless communication, comprising:

one or more memories; and one or more processors coupled to the one or more memories, the one or more memories and the one or more processors configured to:

determine, during an active call on a first radio access technology (RAT), that a first condition for performing a handover from the first RAT to a second RAT is satisfied;

determine that the second RAT would trigger a fallback to a third RAT after the handover from the first RAT to the second RAT;

determine that a second condition for performing a handover from the third RAT to the first RAT is satisfied; and refrain from performing the handover from the first RAT to the second RAT based at least in part on the determination that the second RAT would trigger the fallback and the determination that the second condition for performing the handover from the third RAT to the first RAT is satisfied.

11. The UE of claim 10, wherein the determination that the first condition for performing the handover from the first RAT to the second RAT is satisfied is based at least in part on at least one of:

a preference indicating that the second RAT is preferred over the first RAT for voice calls, a signal strength associated with the first RAT, or a signal strength associated with the second RAT.

12. The UE of claim 10, wherein the one or more processors, when determining that the second RAT would trigger the fallback, are configured to:

determine that a cell identifier associated with the second RAT is included in a set of stored cell identifiers that identifies cells of the second RAT that trigger fallbacks.

13. The UE of claim 10, wherein the one or more processors are further configured to:

determine that the second RAT has triggered a fallback at a time prior to the active call, and store a cell identifier associated with the second RAT in a set of stored cell identifiers that identifies cells of the second RAT that have triggered fallbacks.

14. The UE of claim 10, wherein the determination that the second condition for performing the handover from the third RAT to the first RAT is satisfied is based at least in part on a signal strength associated with the third RAT.

15. The UE of claim 10, wherein the one or more processors are further configured to:

measure a signal strength associated with the third RAT based at least in part on the determination that the second RAT would trigger the fallback.

16. The UE of claim 15, wherein the signal strength associated with the third RAT is measured during an idle time in the second RAT.

17. The UE of claim 15, wherein the signal strength associated with the third RAT is measured using a radio frequency (RF) resource of an unused subscriber identification module (SIM) of the UE.

18. A non-transitory computer-readable medium storing a set of instructions, the set of instructions comprising:

one or more instructions that, when executed by one or more processors of a user equipment (UE), cause the UE to:

determine, during an active call on a first radio access technology (RAT), that a first condition for performing a handover from the first RAT to a second RAT is satisfied;

determine that the second RAT would trigger a fallback to a third RAT after the handover from the first RAT to the second RAT;

determine that a second condition for performing a handover from the third RAT to the first RAT is satisfied; and refrain from performing the handover from the first RAT to the second RAT based at least in part on the determination that the second RAT would trigger the fallback and the determination that the second condition for performing the handover from the third RAT to the first RAT is satisfied.

19. The non-transitory computer-readable medium of claim 18, wherein the determination that the first condition for performing the handover from the first RAT to the second RAT is satisfied is based at least in part on at least one of:

a preference indicating that the second RAT is preferred over the first RAT for voice calls, a signal strength associated with the first RAT, or a signal strength associated with the second RAT.

20. The non-transitory computer-readable medium of claim 18, wherein the one or more instructions that cause the UE to determine that the second RAT would trigger the fallback further cause the UE to:

determine that a cell identifier associated with the second RAT is included in a set of stored cell identifiers that identifies cells of the second RAT that trigger fallbacks.

21. The non-transitory computer-readable medium of claim 18, wherein the one or more instructions further cause the UE to:
  determine that the second RAT has triggered a fallback at a time prior to the active call, and
  store a cell identifier associated with the second RAT in a set of stored cell identifiers that identifies cells of the second RAT that have triggered fallbacks.

22. The non-transitory computer-readable medium of claim 18, wherein the determination that the second condition for performing the handover from the third RAT to the first RAT is satisfied is based at least in part on a signal strength associated with the third RAT.

23. The non-transitory computer-readable medium of claim 18, wherein the one or more instructions further cause the UE to:
  measure a signal strength associated with the third RAT based at least in part on the determination that the second RAT would trigger the fallback.

24. The non-transitory computer-readable medium of claim 23, wherein the signal strength associated with the third RAT is measured during an idle time in the second RAT.

25. The non-transitory computer-readable medium of claim 23, wherein the signal strength associated with the third RAT is measured using a radio frequency (RF) resource of an unused subscriber identification module (SIM) of the UE.

26. The non-transitory computer-readable medium of claim 18, wherein the first RAT is Wi-Fi, the second RAT is New Radio (NR), the third RAT is Long Term Evolution (LTE), and the fallback is an Evolved Packet System (EPS) fallback.

27. An apparatus, comprising:
  means for determining, during an active call on a first radio access technology (RAT), that a first condition for performing a handover from the first RAT to a second RAT is satisfied;
  means for determining that the second RAT would trigger a fallback to a third RAT after the handover from the first RAT to the second RAT;
  means for determining that a second condition for performing a handover from the third RAT to the first RAT is satisfied; and
  means for refraining from performing the handover from the first RAT to the second RAT based at least in part on the determination that the second RAT would trigger the fallback and the determination that the second condition for performing the handover from the third RAT to the first RAT is satisfied.

28. The apparatus of claim 27, wherein the determination that the first condition for performing the handover from the first RAT to the second RAT is satisfied is based at least in part on at least one of:
  a preference indicating that the second RAT is preferred over the first RAT for voice calls,
  a signal strength associated with the first RAT, or
  a signal strength associated with the second RAT.

29. The apparatus of claim 27, wherein the means for determining that the second RAT would trigger the fallback comprise:
  means for determining that a cell identifier associated with the second RAT is included in a set of stored cell identifiers that identifies cells of the second RAT that trigger fallbacks.

30. The apparatus of claim 27, further comprising:
  means for determining that the second RAT has triggered a fallback at a time prior to the active call, and
  means for storing a cell identifier associated with the second RAT in a set of stored cell identifiers that identifies cells of the second RAT that have triggered fallbacks.

\* \* \* \* \*